(12) United States Patent
Freiberger

(10) Patent No.: US 11,206,090 B2
(45) Date of Patent: Dec. 21, 2021

(54) ERROR MEASUREMENT METHOD USING A TIME-VARIANT STOPBAND TEST SIGNAL

(71) Applicant: Intel Corporation, Santa Clara, CA (US)

(72) Inventor: Karl Freiberger, Graz (AT)

(73) Assignee: MaxLinear, Inc., Carlsbad, CA (US)

( * ) Notice: Subject to any disclaimer, the term of this patent is extended or adjusted under 35 U.S.C. 154(b) by 786 days.

(21) Appl. No.: 15/716,990

(22) Filed: Sep. 27, 2017

(65) Prior Publication Data

US 2018/0278344 A1 Sep. 27, 2018

Related U.S. Application Data

(60) Provisional application No. 62/476,405, filed on Mar. 24, 2017, provisional application No. 62/477,186, filed on Mar. 27, 2017.

(51) Int. Cl.
| | |
|---|---|
| *H04B 1/69* | (2011.01) |
| *H04B 17/00* | (2015.01) |
| *H04L 1/24* | (2006.01) |
| *H04L 27/00* | (2006.01) |
| *H04L 1/20* | (2006.01) |

(52) U.S. Cl.
CPC ......... *H04B 17/0085* (2013.01); *H04B 1/69* (2013.01); *H04L 1/244* (2013.01); *H04B 2001/6912* (2013.01); *H04L 1/203* (2013.01); *H04L 27/0008* (2013.01)

(58) Field of Classification Search
CPC .......... G06F 11/00; G06F 15/00; G06F 19/00; H04B 1/00; H04B 1/69; H04B 7/02; H04B 15/00; H04B 17/00; H04B 17/0085; H04L 1/20; H04L 1/203; H04L 27/28; H04L 27/0008; H04R 29/00; H04R 29/001
USPC ....... 375/139, 227, 260, 267; 455/63.1, 296; 702/117; 714/738
See application file for complete search history.

(56) References Cited

U.S. PATENT DOCUMENTS

| | | | |
|---|---|---|---|
| 2008/0056395 A1* | 3/2008 | Brink ..................... | H04L 5/0044 375/260 |
| 2008/0298449 A1 | 12/2008 | Yokoyama et al. | |
| 2012/0217980 A1* | 8/2012 | Pausini .................. | G01R 29/26 324/613 |
| 2013/0226499 A1* | 8/2013 | Platt ..................... | G01R 31/2837 702/117 |
| 2013/0234728 A1* | 9/2013 | Olgaard ............. | G01R 31/2841 324/633 |

(Continued)

OTHER PUBLICATIONS

Freiberger, Karl. "A Noise Power Ratio Measurement Method for Accurate Estimation of the Error Vector Magnitude." IEEE Transactions on Microwave Theory and Techniques, vol. 65, No. 5, May 2017, 14 pages.

(Continued)

*Primary Examiner* — Shawkat M Ali
(74) *Attorney, Agent, or Firm* — Maschoff Brennan

(57) ABSTRACT

Systems, methods, and circuitries are provided to measure a swept error power ratio (SWEEPR) of a device under test. A method includes generating a time-variant stopband test signal having a time-variant stopband and determining an error of the device under test based on an output signal generated by the device under test in response to the time-variant stopband test signal.

22 Claims, 2 Drawing Sheets

(56) References Cited

U.S. PATENT DOCUMENTS

2015/0010170 A1* 1/2015 Lindahl .............. H03H 17/0283
                                                    381/119
2017/0118569 A1* 4/2017 Quan ................... H04R 29/004
2017/0317766 A1* 11/2017 Vella-Coleiro ........ G01R 23/20

OTHER PUBLICATIONS

Freiberger, Karl et al, "SLIC EVM—Error Vector Magnitude without Demodulation." 4 pages.

* cited by examiner

ERROR MEASUREMENT METHOD USING A TIME-VARIANT STOPBAND TEST SIGNAL

CROSS REFERENCE TO RELATED APPLICATIONS

The present application claims the benefit of priority from U.S. Provisional Patent Application Ser. No. 62/476,405, filed on Mar. 24, 2017, and U.S. Provisional Patent Application Ser. No. 62/477,186, filed on Mar. 27, 2017, both of which are incorporated herein in their entirety.

FIELD

The present disclosure relates to the field of communication systems, and a system and method for measuring signal quality that is frequency-dependent.

BACKGROUND

In design and test of electronic systems and components, a measured quantification of the error introduced by non-ideal, e.g., noisy and/or nonlinear, components is an important issue. The error degrades the signal quality and can be heavily frequency-dependent. Known methods for in-band-error measurement are the error vector magnitude (EVM) and noise power ratio (NPR).

EVM measurements require synchronization and accurate demodulation. Consequently, related errors bias the result and it is hard to achieve a very low measurement noise floor for wide bandwidths. EVM also requires standard-specific demodulation. Consequently, EVM analyzers are expensive, either in development cost or cost to buy software licenses. At the time of developing a transceiver for an upcoming standard, a dedicated EVM analyzer may not even be available. The EVM includes IQ mismatch, also that of the measurement chain, which may bias the result of the actual device under test (DUT) (e.g., a power amplifier).

In NPR, a test signal having a fixed stopband is input to the DUT and the DUT's output signal is measured. A ratio (the NPR) is computed between the power spectral density (PSD) of the output signal in the stopband (which theoretically isolates the error produced by the DUT at the stopband frequency) and the PSD of the output signal outside the stopband (also called the in-band signal). The NPR has a fundamental limitation that it observes the error only within a time-invariant stopband, which can only be a fraction of the signal bandwidth. To address this limitation, several measurements with different stopband center frequencies can be made to observe the error over the whole in-band. However, for an NPR measurement with a stop-bandwidth equaling the subcarrier spacing (which is beneficial for obtaining results comparable with EVM), 512 different excitation signals and separate measurements are needed in case of WLAN with 160 MHz bandwidth. Consequently, measurement of frequency-dependent errors is slow using standard NPR techniques When measuring nonlinear systems, it is advantageous that the excitation signal statistics resemble the actual (communication) signal so that not only harmonic distortion but also intermodulation is considered. This is not possible with (swept) sine methods. Consequently, the results of these methods are not comparable to those obtained with EVM or the NPR, which use a richer, noise-like excitation signal.

DESCRIPTION

Figure 1:
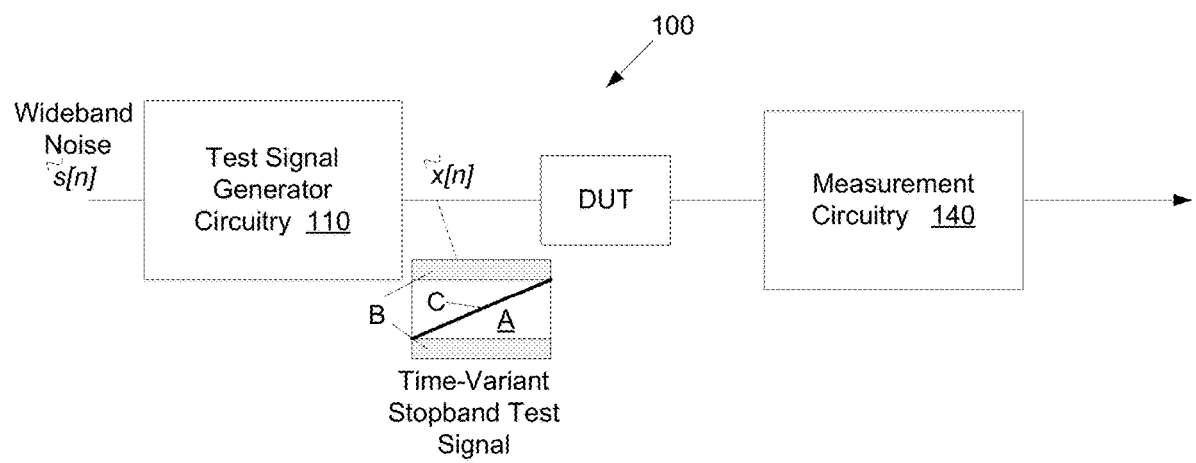
FIG. 1 illustrates a measurement system that generates a time-variant stopband test signal in accordance with various aspects described.

Described herein are methods, systems, and circuitries that generate a time-variant stopband test signal that facilitates measurement of a swept error power ratio (SWEEPR). This time-variant stopband test signal allows frequency-dependent in-band/error PSD measurements to be made with standard lab gear (e.g., a signal generator and swept-tuned spectrum analyzer). For the purposes of this description, the time-variant stopband test signal and SWEEPR measurements will be described in the context of the testing of communication system components (e.g., power amplifier). However, the described aspects can be applied to any measurement of error or noise in a component that inputs a broadband excitation signal and outputs a signal and uncorrelated noise (e.g., an analog-to-digital converter (ADC) processing audio signals).

The present disclosure will now be described with reference to the attached figures, wherein like reference numerals are used to refer to like elements throughout, and wherein the illustrated structures and devices are not necessarily drawn to scale. As utilized herein, terms "module", "component," "system," "circuit," "element," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include one or more processors therein to execute executable instructions stored in computer readable medium and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

FIG. 1 illustrates an example measurement system 100 configured to compute or estimate an error generated by a device under test (DUT). The system 100 includes test signal generation circuitry 110 that generates a unique test signal that includes a time-variant stopband. The test generation circuitry 110 receives a source signal $\tilde{s}[n]$ and generates the test signal $\tilde{x}$. A simplified block diagram of an example of the time-variant stopband test signal $\tilde{x}[n]$ during a single "sweep" (e.g., a predetermined amount of time) is illustrated in FIG. 1. An in-bound region A includes a relatively high amount of signal energy in a frequency region surrounding a center frequency of the test signal. The shaded regions B represent lower energy bands at the edges of the test signal. The dark band C is a stopband that has "zero" energy. It can be seen that the frequency at which the stopband occurs varies as a function of time. The time-variant stopband test signal is input to a DUT and the output signal generated by the DUT is provided to measurement circuitry 140 for the purpose of estimating or computing the error generated by the DUT.

As will be described in more detail below, the characteristic time-variant stopband test signal allows for quick, frequency-dependent error measurements with standard swept-tuned power spectrum analyzers, alleviating the need of expensive, dedicated receivers used in EVM. The characteristic time-variant stopband test signal alleviates the need for consecutive measurement with several excitation signals necessary in NPR. Note that while NPR is slow when used to measure frequency-dependent error, NPR may perform faster than the time-variant stopband test signal techniques disclosed herein when the error is not frequency-dependent. In contrast to swept-sine methods the time-variant stopband test signal is broadband, leading to nonlinear distortion products similar to that during regular operation with broadband signals (swept-sine cannot fully capture the in-band error of nonlinear devices).

Figure 2:
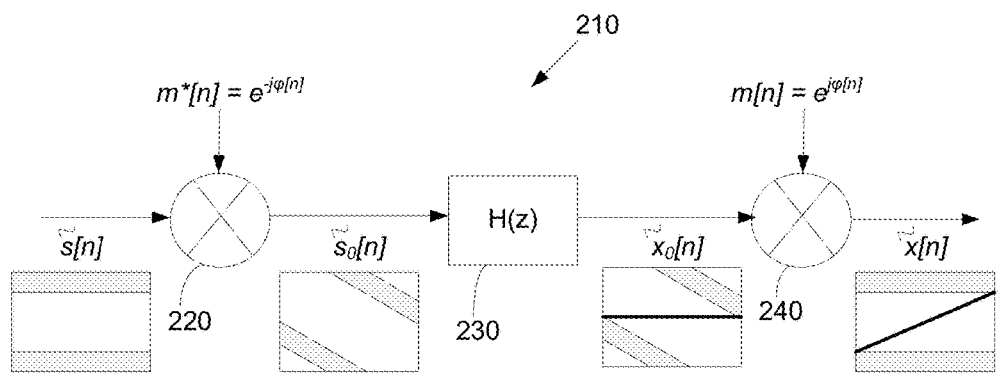
FIG. 2 illustrates an example test signal generation circuitry that generates a time-variant stopband test signal in accordance with various aspects described.

FIG. 2 illustrates an example of a test signal generation circuitry 210 that generates a time-variant stopband test signal $\tilde{x}[n]$ by digitally filtering a source signal $\tilde{s}[n]$. Here, ~ denotes complex-valued baseband signals, and n is the discrete time index. When testing nonlinear systems, the statistics of the test excitation signal should match those of actual the communication signal used in normal operation. Therefore, in one example, the source $\tilde{s}[n]$ is a Gaussian signal, (e.g. an OFDM communication signal) because Gaussians remain Gaussians when linearly filtered.

The goal to measure SWEEPR is to linearly sweep the center frequency of the stopband from a start-frequency $f_0=f(t=0)$ and a stop frequency $f_1=f(t=T1)$, where t denotes time and T1 is the duration of the stop-band sweep. A reasonable choice for the start and stop frequency is to cover the whole in-band (e.g., from −20 to 20 MHz for a 40 MHz bandwidth communication signal). The test signal generation circuitry 210 includes a first mixer 220, a high pass filter 230, and a second mixer 240. The high pass filter 230 is a fixed time-invariant highpass filter. The first mixer 220 uses a chirp to modulate the stopband center frequency f(t) to DC at time t to produce the modulated source signal $\tilde{s}_0[n]$. The second mixer 240 uses a chirp to demodulate the filtered signal $\tilde{x}_0[n]$ back to the original frequency location f(t) with the inverse sweep.

The chirp modulation is performed by mixing the source signal with a complex exponential m(t) with a varying frequency (e.g., continuously increasing/decreasing instantaneous phase), which sets the chirp rate. The corresponding instantaneous frequency is f(t) has a desired linear chirp sweeping from $f_0=f(t=0)$ to $f_1(t=T1)$. The complex conjugate m*(t) is the inverse sweep having an instantaneous frequency $f_1$ at t=0 and $f_0$ at t=T1. The modulation theorem of the Fourier transform is s(t) and by modulating with m(t) the spectrum is shifted to the 'right'. Since initially it is desired to shift the source spectrum to the 'left' (to DC), then filter it, and then shift it back to the 'right', the modulation performed by the first mixer 220 uses modulation signal m*(t) while the demodulation performed by the second mixer 240 uses demodulation signal m(t), as shown in FIG. 2. The discrete time modulation signal is given as m[n], where the sampling interval is T=1/fs, and the sampling rate is $J_s$ =50 MHz in one example.

Figure 3:
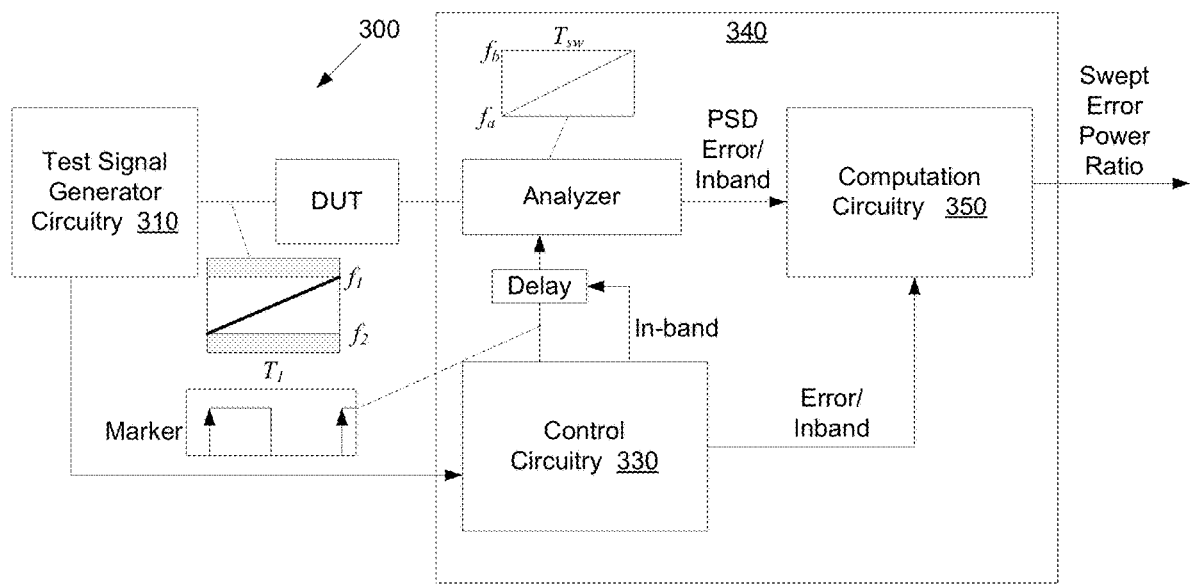
FIG. 3 illustrates an example measurement system that generates a time-variant stopband test signal and computes a swept error power ratio in accordance with various aspects described.

FIG. 3 illustrates an example test system 300 that inputs the time-variant stopband test signal to DUT having an output connected to a super heterodyne spectrum analyzer and computes a swept error power ratio (SWEEPR) of the DUT. The system 300 includes a test signal generator circuitry 310 that generates a time-variant stopband test signal and measurement circuitry 340 that computes the SWEEPR. In one example, the test signal generator circuitry 310 comprises a standard signal generator; such is used in a laboratory. The measurement circuitry 340 includes control circuitry 330 that controls the analyzer and computation circuitry 350 that computes the SWEEPR from the output of the analyzer.

In one example, the analyzer is a super heterodyne spectrum analyzer, also known as a swept tuned analyzer. Super heterodyne spectrum analyzers tune into different analysis frequencies by sweeping the local oscillator frequency of the analyzer's down-mixer, from a start frequency $f_a$ to a stop frequency $f_b$ during a sweep time or period $T_{sw}$ (as shown in FIG. 3). This sweep is used to mix the input test signal down to an intermediate frequency (IF). After down-mixing to IF, the signal is filtered with a band-pass filter (BPF) centered at IF. This BPF determines the resolution bandwidth (RBW) of the spectral analysis. The power of the BPF output is measured using an envelope detector, whose output can further he smoothed by the video bandwidth (VBW) filter.

Because the start of the analyzer sweep can typically be triggered from an external input, swept-tuned analyzers are well suited to analyze the time-variant stopband test signal. The start and stop frequency and the sweep-time of the analyzer are set to be equal to those of the time-variant stopband test signal. The control circuitry 330 provides a trigger signal to the analyzer that triggers the analyzer's sweep. In one example, the trigger signal is an externally generated square wave marker signal whose rising edges trigger the analyzer. Coarse compensations can be made by the control circuitry 330 to account for potential delay between the trigger and signal path. This can be done by cyclically shifting the marker signal.

In this manner, the time-variant stopband test signal's stopband sweep and the analyzer sweep are synchronized and the analyzer is outputting/displaying the stop-band or error PSD. To measure the in-band PSD, the control circuitry 330 delays the trigger signal by a delay period or offset, (e.g., half the sweep period) so that the analyzer samples the in-band component of the signal or in-band PSD instead. The control circuitry 330 controls the computation circuitry 350 by identifying whether the output of the analyzer presently corresponds to either the error component signal or the in-band signal. The computation circuitry 350 computes the ratio of the error PSD to the in-band PSD and outputs it as the SWEEPR result. FIG. 2 shows a block diagram visualizing the setup of SWEEPR measurements. Note that the "synchronization" used for the system 300 (i.e., setting trigger-delay, sweep-time, start and stop frequency) is much simpler than the sample-wise synchronization needed for EVM.

In one example, several (e.g., N=5) swept stopbands can be used and the power spectral density (PSD) in all these N stopbands can be averaged. Such averaging decreases the variance of the measurement. IQ mismatch can either be included or excluded in the result by using a symmetric or asymmetric stop-band sweep, similar to IQ mismatch exclusion proposed for traditional NPR measurements.

To reduce variance to obtain precise measurements, the length of the time-variant stopband test signal may be increased in some instances, and may get too long, because the SWEEPR averages the error over less bandwidth per time than the EVM. In one example, the process can be extended to using several sweeps at once, reducing the variance at the cost of potentially increased bias. If a quick SWEEPR measurement reveals that the error is not heavily frequency-dependent, the error power ratio (EPR) may produce better estimates of the EVM of the device under test.

Figure 4:
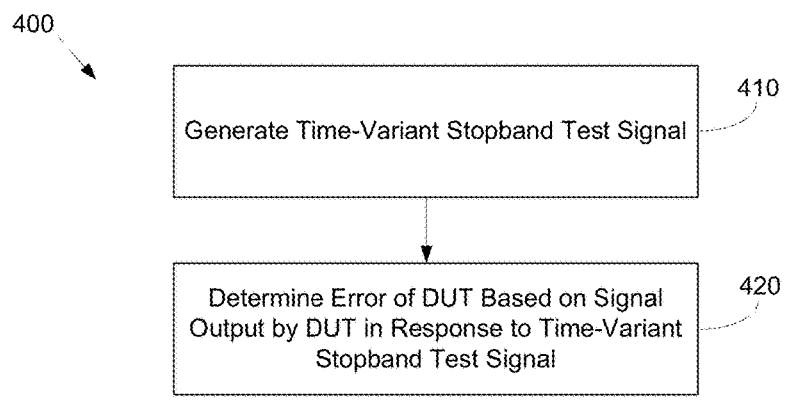
FIG. 4 illustrates a flow diagram of an example method for computing a swept error power ratio in accordance with various aspects described.

FIG. 4 illustrates an example method 400 for measuring an error of a device. The method includes, at 410, generating a time-variant stopband test signal having a time-variant stopband. At 420, an error of a device under test is determined based on an output signal generated by the device under test in response to the time-variant stopband test signal.

It can be seen from the foregoing description that an example filtering procedure to obtain a time-variant stopband test signal featuring at least one time-variant stopband has been provided as well as one example analysis and measurement setup. The source signal (typically the communication signal of interest) is filtered with a stopband or notch filter with a time-varying center-frequency. Typically, this center-frequency will be linearly swept. This time-varying filtering can be implemented via modulation with a linear chirp, a high-pass filter, and demodulation with a linear chirp. In the measurement/analysis procedure, a swept tuned analyzer is triggered in sync with the excitation signal. By changing the trigger delay, the power spectral density (PSD) within the stopband (noise+distortion) or the PSD outside the stopband (signal+noise+distortion) is obtained. The frequency dependent "swept-error power ratio" (SWEEPR), is the ratio of these two quantities.

In contrast to EVM, the described SWEEPR analysis can be made without phase information, via power spectrum analysis only. In contrast to NPR which has a fixed stopband, the time-variant stopband test signal features a swept stopband that can be obtained with a filter. Also, the SWEEPR analysis differs from NPR analysis. In one example, at least one sweep in sync with the stopband center frequency is made to obtain the error PSD, and at least one sweep outside the stopband is made to obtain the present signal PSD. The ratio of these two PSDs is the SWEEPR.

The SWEEPR is based on continuously sweeping the stop-band center frequency of a noise power ratio (NPR) measurement. The SWEEPR can be measured with standard RF lab gear, i.e., an arbitrary waveform generator and a swept-tuned spectrum analyzer. With NPR, 113 individual measurements each with a different excitation signal would be required to estimate the subcarrier-dependent EVM of a 40 MHz WLAN signal. With SWEEPR, only a single excitation signal and two measurements to capture the stopband and present-band PSD, are necessary for this. In contrast to the EVM, SWEEPR analysis does not need accurate synchronization and demodulation, making it readily adaptable to new standards and higher bandwidths.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a test system configured to determine an error of a device under test, including a test signal generator circuitry configured to generate a time-variant stopband test signal having a time-variant stopband and measurement circuitry configured to determine the error of the device under test based on an output signal generated by the device under test in response to the time-variant stopband test signal.

Example 2 includes the subject matter of example 1, including or omitting optional elements, wherein the test signal generator includes a first mixer configured to modulate a source signal with a modulation signal having a varying frequency to generate a modulated signal; a high-pass filter configured to filter the modulated signal to generate a filtered signal; and a second mixer configured to demodulate the filtered signal with a demodulation signal to generate the time-variant stopband test signal, wherein the demodulation signal has a varying frequency that varies in an opposite manner as compared to the frequency of the modulation signal.

Example 3 includes the subject matter of example 2, including or omitting optional elements, wherein the modulation signal and the demodulation signals are chirp signals.

Example 4 includes the subject matter of examples 1-3, including or omitting optional elements, further including control circuitry configured to for a first sweep period, trigger a swept-tuned analyzer in synchronization with the time-variant stopband test signal, wherein the analyzer receives the output signal generated by the device under test in response to the time-variant stopband test signal, such that the output of the analyzer corresponds to a power spectral density (PSD) of an error component of the an output signal of the device under test; and for a second sweep period, after a delay period trigger the swept-tuned analyzer in synchronization with the time-variant stopband test signal, such that the output of the analyzer corresponds to a power spectral density (PSD) of an in-band component of the output signal of the device under test.

Example 5 includes the subject matter of examples 1-3, including or omitting optional elements, wherein the measurement circuitry is configured to determine the error by calculating a ratio between a PSD of an error component of the output signal that is generated in response to the stopband in the time-variant stopband test signal and a PSD of an in-band component of the output signal that occurs in response to an in-band component of the time-variant stopband test signal.

Example 6 includes the subject matter of example 5, including or omitting optional elements, wherein the test signal generator circuitry is configured to generate a time-variant stopband test signal that includes a plurality of time varying stopbands and wherein the measurement circuitry is configured to calculate the ratio for each of the plurality of stopbands and determine the error based on an average of the ratios.

Example 7 is a method, including generating a time-variant stopband test signal having a time-variant stopband and determining an error of a device under test based on an output signal generated by the device under test in response to the time-variant stopband test signal.

Example 8 includes the subject matter of example 7, including or omitting optional elements, wherein generating the time-variant stopband test signal includes modulating a source signal with a modulation signal having a varying frequency to generate a modulated signal; filtering the modulated signal to generate a filtered signal; and demodulating the filtered signal with a demodulation signal to generate the time-variant stopband test signal, wherein the demodulation signal has a varying frequency that varies in an opposite manner as compared to the frequency of the modulation signal.

Example 9 includes the subject matter of example 8, including or omitting optional elements, wherein the modulation signal and the demodulation signals are chirp signals.

Example 10 includes the subject matter of examples 7-9, including or omitting optional elements, further including for a first sweep period, triggering a swept-tuned analyzer in synchronization with the time-variant stopband test signal, wherein the analyzer receives the output signal generated by the device under test in response to the time-variant stopband test signal, such that the output of the analyzer corresponds to a power spectral density (PSD) of an error component of the an output signal of the device under test; and for a second sweep period, after a delay period triggering the swept-tuned analyzer in synchronization with the time-variant stopband test signal, such that the output of the analyzer corresponds to a power spectral density (PSD) of an in-band component of the output signal of the device under test.

Example 11 includes the subject matter of examples 7-9, including or omitting optional elements, wherein determining the error includes calculating a ratio between a PSD of an error component of the output signal that is generated in response to the stopband in the time-variant stopband test signal and a PSD of an in-band component of the output signal that occurs in response to an in-band component of the time-variant stopband test signal.

Example 12 includes the subject matter of example 11, including or omitting optional elements, including generating a time-variant stopband test signal that includes a plurality of time varying stopbands, calculating the ratio for each of the plurality of stopbands and determining the error based on an average of the ratios.

Example 13 is a computer readable medium storing executable instructions, that, when executed by a processor, cause the processor to perform corresponding functions, the functions including controlling a signal generator to generate a time-variant stopband test signal having a time-variant stopband and controlling an analyzer to determine an error of a device under test based on an output signal generated by the device under test in response to the time-variant stopband test signal.

Example 14 includes the subject matter of example 13, including or omitting optional elements, wherein the instructions include instructions that cause the processor to control the signal generator to input a source signal; modulate the source signal with a modulation signal having a varying frequency to generate a modulated signal; filter the modulated signal to generate a filtered signal; and demodulate the filtered signal with a demodulation signal to generate the time-variant stopband test signal, wherein the demodulation signal has a varying frequency that varies in an opposite manner as compared to the frequency of the modulation signal.

Example 15 includes the subject matter of example 14, including or omitting optional elements, wherein the modulation signal and the demodulation signals are chirp signals.

Example 16 includes the subject matter of examples 13-15, including or omitting optional elements, wherein the instructions include instructions that cause the processor to for a first sweep period, trigger the analyzer in synchronization with the time-variant stopband test signal, wherein the analyzer receives the output signal generated by the device under test in response to the time-variant stopband test signal, such that the output of the analyzer corresponds to a power spectral density (PSD) of an error component of the an output signal of the device under test and for a second sweep period, after a delay period trigger the analyzer in synchronization with the time-variant stopband test signal, such that the output of the analyzer corresponds to a power spectral density (PSD) of an in-band component of the output signal of the device under test.

Example 17 includes the subject matter of examples 13-15, including or omitting optional elements, wherein the instructions include instructions that cause the processor to calculate a ratio between a PSD of an error component of the output signal that is generated in response to the stopband in the time-variant stopband test signal and a PSD of an in-band component of the output signal that occurs in response to an in-band component of the time-variant stopband test signal.

Example 18 includes the subject matter of example 17, including or omitting optional elements, wherein the instructions include instructions that cause the processor to control the signal generator to generate a time-variant stopband test signal that includes a plurality of time varying stopbands, calculate the ratio for each of the plurality of stopbands; and determine the error based on an average of the ratios.

Example 19 is an apparatus, including means for generating a time-variant stopband test signal having a time-variant stopband and means for determining an error of a device under test based on an output signal generated by the device under test in response to the time-variant stopband test signal.

Example 20 includes the subject matter of example 19, including or omitting optional elements, wherein the means for generating the time-variant stopband test signal includes means for modulating a source signal with a modulation signal having a varying frequency to generate a modulated signal; means for filtering the modulated signal to generate a filtered signal; and means for demodulating the filtered signal with a demodulation signal to generate the time-variant stopband test signal, wherein the demodulation signal has a varying frequency that varies in an opposite manner as compared to the frequency of the modulation signal.

Example 21 includes the subject matter of examples 19-20, including or omitting optional elements, further including means for triggering a swept-tuned analyzer in synchronization with the time-variant stopband test signal for a first sweep period, wherein the analyzer receives the output signal generated by the device under test in response to the time-variant stopband test signal, such that the output of the analyzer corresponds to a power spectral density (PSD) of an error component of the an output signal of the device under test and means for triggering, after a delay period, the swept-tuned analyzer in synchronization with the time-variant stopband test signal for a second sweep period, such that the output of the analyzer corresponds to a power spectral density (PSD) of an in-band component of the output signal of the device under test.

Example 22 includes the subject matter of examples 19-20, including or omitting optional elements, wherein the means for determining the error includes means for calculating a ratio between a PSD of an error component of the output signal that is generated in response to the stopband in the time-variant stopband test signal and a PSD of an in-band component of the output signal that occurs in response to an in-band component of the time-variant stopband test signal.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. The various illustrative logics, logical blocks, modules, and circuits described in connection with aspects disclosed herein can be implemented or performed with a general purpose processor executing instructions stored in computer readable medium.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application. The use of the phrase "one or more of A, B, or C" is intended to include all combinations of A, B, and C, for example A, A and B, A and B and C, B, and so on.

The invention claimed is:

1. A test system configured to determine an error of a device under test, comprising:
   a test signal generator circuitry configured to generate a time-variant stopband test signal having a time-variant stopband; and
   measurement circuitry configured to determine the error of the device under test based on an output signal generated by the device under test in response to the time-variant stopband test signal, wherein the measurement circuitry is configured to determine the error by calculating a ratio between a power spectrum density (PSD) of an error component of the output signal and PSD of an in-band component of the output signal.

2. The test system of claim 1, wherein the test signal generator comprises:

a first mixer configured to modulate a source signal with a modulation signal having a varying frequency to generate a modulated signal;

a highpass filter configured to filter the modulated signal to generate a filtered signal; and a second mixer configured to demodulate the filtered signal with a demodulation signal to generate the time-variant stopband test signal, wherein the demodulation signal has a varying frequency that varies in an opposite manner as compared to the frequency of the modulation signal.

3. The test system of claim 2, wherein the modulation signal and the demodulation signal are chirp signals.

4. The test system of claim 1, further comprising control circuitry configured to:

for a first sweep period, trigger a swept-tuned analyzer in synchronization with the time-variant stopband test signal, wherein the swept-tuned analyzer receives the output signal generated by the device under test in response to the time-variant stopband test signal, in a manner that the output of the swept-tuned analyzer corresponds to the PSD of the error component of the output signal of the device under test; and for a second sweep period, after a delay period trigger the swept-tuned analyzer in synchronization with the time-variant stopband test signal, in an manner that the output of the swept-tuned analyzer corresponds to the PSD of the in-band component of the output signal of the device under test.

5. The test system of claim 1, wherein the output signal is generated in response to the stopband in the time-variant stopband test signal and the PSD of the in-band component of the output signal occurs in response to an in-band component of the time-variant stopband test signal.

6. The test system of claim 5, wherein the test signal generator circuitry is configured to generate the time-variant stopband test signal that includes a plurality of time varying stopbands and wherein the measurement circuitry is configured to calculate the ratio for each of the plurality of stopbands and determine the error based on an average of the ratios.

7. A method, comprising:

generating a time-variant stopband test signal having a time-variant stopband;

determining an error of a device under test based on an output signal generated by the device under test in response to the time-variant stopband test signal;

for a first sweep period, triggering a swept-tuned analyzer in synchronization with the time-variant stopband test signal; and for a second sweep period, triggering the swept-tuned analyzer in synchronization with the time-variant stopband test signal.

8. The method of claim 7, wherein generating the time-variant stopband test signal comprises:

modulating a source signal with a modulation signal having a varying frequency to generate a modulated signal;

filtering the modulated signal to generate a filtered signal; and demodulating the filtered signal with a demodulation signal to generate the time-variant stopband test signal, wherein the demodulation signal has a varying frequency that varies in an opposite manner as compared to the frequency of the modulation signal.

9. The method of claim 8, wherein the modulation signal and the demodulation signal are chirp signals.

10. The method of claim 7, wherein the swept-tuned analyzer receives the output signal generated by the device under test in response to the time-variant stopband test signal, in a manner that an output of the swept-tuned analyzer corresponds to a power spectral density (PSD) of an error component of the output signal of the device under test, wherein the swept-tuned analyzer is triggered after a delay period and the output of the swept-tuned analyzer corresponds to the PSD of an in-band component of the output signal of the device under test.

11. The method of claim 7, wherein determining the error comprises calculating a ratio between a power spectrum density (PSD) of an error component of the output signal that is generated in response to the stopband in the time-variant stopband test signal and a PSD of an in-band component of the output signal that occurs in response to an in-band component of the time-variant stopband test signal.

12. The method of claim 11, comprising generating the time-variant stopband test signal that includes a plurality of time varying stopbands, calculating the ratio for each of the plurality of stopbands and determining the error based on an average of the ratios.

13. A non-transitory computer readable medium storing executable instructions, that, when executed by a processor, cause the processor to perform corresponding functions, the functions comprising:

controlling a signal generator to generate a time-variant stopband test signal having a time-variant stopband; and controlling an analyzer to determine an error of a device under test based on an output signal generated by the device under test in response to the time-variant stopband test signal, wherein the instructions include further instructions that cause the processor to calculate a ratio between a power spectrum density (PSD) of an error component of the output signal.

14. The non-transitory computer readable medium of claim 13, wherein the instructions include further instructions that cause the processor to control the signal generator to:

input a source signal;

modulate the source signal with a modulation signal having a varying frequency to generate a modulated signal;

filter the modulated signal to generate a filtered signal; and demodulate the filtered signal with a demodulation signal to generate the time-variant stopband test signal, wherein the demodulation signal has a varying frequency that varies in an opposite manner as compared to the frequency of the modulation signal.

15. The non-transitory computer readable medium of claim 14, wherein the modulation signal and the demodulation signal are chirp signals.

16. The non-transitory computer readable medium of claim 13, wherein the instructions include further instructions that cause the processor to:

for a first sweep period, trigger the analyzer in synchronization with the time-variant stopband test signal, wherein the analyzer receives the output signal generated by the device under test in response to the time-variant stopband test signal, in a manner that an output of the analyzer corresponds to the PSD of the error component of the output signal of the device under test; and for a second sweep period, after a delay period trigger the analyzer in synchronization with the time-variant stopband test signal, in a manner that the output of the analyzer corresponds to the PSD of an in-band component of the output signal of the device under test.

17. The non-transitory computer readable medium of claim 13, wherein the output signal is generated in response to the stopband in the time-variant stopband test signal and the PSD of an in-band component of the output signal that occurs in response to an in-band component of the time-variant stopband test signal.

18. The non-transitory computer readable medium of claim 17, wherein the instructions include further instructions that cause the processor to:
control the signal generator to generate the time-variant stopband test signal that includes a plurality of time varying stopbands,
calculate the ratio for each of the plurality of stopbands; and
determine the error based on an average of the ratios.

19. An apparatus, comprising:
means for generating a time-variant stopband test signal having a time-variant stopband; and
means for determining an error of a device under test based on an output signal generated by the device under test in response to the time-variant stopband test signal, wherein the means for determining the error comprises means for calculating a ratio between a power spectrum density (PSD) of an error component of the output signal and a PSD of an in-band component of the output signal.

20. The apparatus of claim 19, wherein the means for generating the time-variant stopb and test signal comprises:
means for modulating a source signal with a modulation signal having a varying frequency to generate a modulated signal;
means for filtering the modulated signal to generate a filtered signal; and
means for demodulating the filtered signal with a demodulation signal to generate the time-variant stopband test signal, wherein the demodulation signal has a varying frequency that varies in an opposite manner as compared to the frequency of the modulation signal.

21. The apparatus of claim 19, further comprising:
means for triggering a swept-tuned analyzer in synchronization with the time-variant stopband test signal for a first sweep period, wherein the swept-tuned analyzer receives the output signal generated by the device under test in response to the time-variant stopband test signal, in a manner that an output of the swept-tuned analyzer corresponds to the PSD of the error component of the output signal of the device under test; and
means for triggering, after a delay period, the swept-tuned analyzer in synchronization with the time-variant stopband test signal for a second sweep period, in a manner that the output of the swept-tuned analyzer corresponds to the PSD of the in-band component of the output signal of the device under test.

22. The apparatus of claim 19, wherein the error component of the output signal is generated in response to the stopband in the time-variant stopband test signal and the PSD of the in-band component of the output signal occurs in response to an in-band component of the time-variant stopband test signal.

* * * * *